Patented June 12, 1951

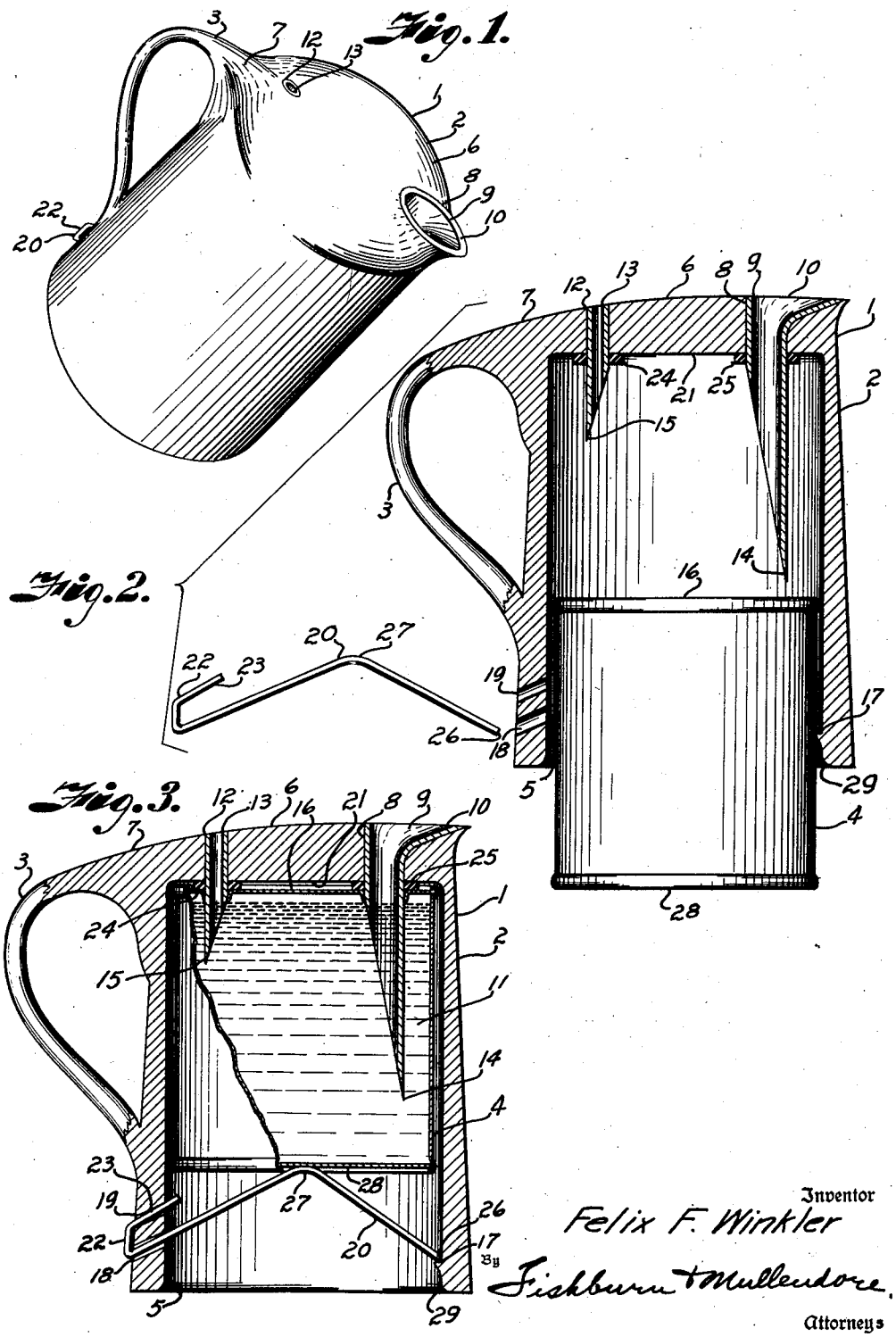

2,556,311

UNITED STATES PATENT OFFICE 2,556,311

MILK CAN HOLDER WITH CAN PUNCTURING MEANS AND MEANS FOR DISPENSING THE CAN CONTENTS

Felix F. Winkler, Kansas City, Mo.

Application November 12, 1948, Serial No. 59,684

3 Claims. (Cl. 222—86)

This invention relates to a milk can container and server, and more particularly to a device for puncturing the tops of condensed milk cans and the like and dispensing the milk therefrom.

The principal object of the present invention is to provide means for urging the milk can toward the top of the container or holder in which the can is contained for the dispensing of the milk.

Other objects of the present invention are to provide a holder in which a can may be securely held within the holder and the latter employed on the table or other desired place of the user for dispensing the contents of the can in desired quantities without the milk dripping or running down the sides of the holder; to provide means for puncturing the top of the milk can; to provide a device for completely draining the milk from the can to prevent improper leakage and unsanitary conditions in the device; to provide a can puncturing spout, and air hole puncturing tube and means around the tube for preventing air from entering the milk can and thus prevent the spoilage of the milk and to provide a device of this character, simple, economical to manufacture and efficient in operation.

In accomplishing these and other objects of the present invention, I have provided improved details of structure, the preferred form of which is illustrated in the accompanying drawing, wherein:

Fig. 1 is a perspective view of my invention.

Fig. 2 is a vertical-sectional view through the device with parts shown in disassembled relation.

Fig. 3 is a vertical-sectional view through the device in assembled condition.

Referring more in detail to the drawing:

1 designates a milk can holder and dispenser embodying the features of my invention comprising a holder or receptacle 2 having a handle 3, the receptacle being adapted to receive the milk can 4 through the open bottom 5 of receptacle. The top 6 of the holder is slightly rounded and curved to form a pleasing appearance for the device and the handle is formed integral with the top as indicated at 7.

The top 6 is provided with an opening 8 adapted to receive a tube 9 forming a spout 10 for dispensing milk 11 from the can 4. The top 6 is also provided with an opening 12 near the handle portion thereof, to receive a tube 13 for allowing air to enter the can 4. Both of the tubes 9 and 13 are cut at an angle forming sharp points 14 and 15 respectively for piercing the top 16 of the can as will later be shown, the tube 9 being substantially longer than the tube 13 to extend a substantial distance into the milk in the can to aid in the dispensing of the milk therefrom.

The inside wall of the holder or receptacle 2 is provided with a lug or shoulder 17 and the wall of the receptacle opposite the lug 17 is provided with spaced openings 18 and 19 adapted to receive a substantially V-shaped spring clip 20 for urging the can 4 against the underneath surface 21 of the top 6. The spring clip is provided with a U-shaped hook 22 on one end having a leg portion 23 adapted to engage in the opening 19 in the wall of the holder 2.

In operation of the device the milk can 4 is inserted into the bottom of the receptacle 2 and the points 14 and 15 of the tubes 9 and 13 will pierce the top 16 of the can and the can will be pushed manually against the underneath side of the top 6 of the holder. Rubber washers or the like 24 and 25 encircle the tubes 9 and 13 between the top 16 of the can and the under surface 21 of the top 6 of the holder to prevent spilling of the milk from the can when it is being dispensed therefrom.

The end 26 of the spring clip 20 is inserted through the opening 18 in the wall of the holder after the can has been inserted in the holder and the leg 23 of the hook 22 is inserted in the opening 19 in the wall. With the clip in this position the closed portion 27 of the V-shaped clip will engage the bottom 28 of the can and urge the can against the top of the holder. End 26 of the clip may be manually inserted above the lug 17 so that the spring will tension against the bottom of the can. The wall of the holder or receptacle is curved or rounded slightly as indicated at 29 Fig. 3 so as to facilitate the insertion of the spring over the lug.

It will be obvious from the foregoing that I have provided an improved milk can holder and dispenser in which the spring clip will urge the can against the top of the holder at all times and prevent spilling of the milk from the can and thus avoid unsanitary conditions and allow the can to be stored in the holder in the refrigerator or other place of storage for an indefinite length of time.

What I claim and desire to secure by Letters Patent is:

1. A receptacle of the character described having a closed top and an open bottom, said receptacle being adapted to receive a sealed container through the open bottom, the top of said receptacle having openings therein, a tube extending through one of said openings and its outer end forming a spout, a second tube extending through the other opening in said top serving as an air inlet, the lower ends of the tubes having sharp points for puncturing the top of the sealed container when the receptacle is placed thereover, the inside wall of said receptacle being provided with a lug spaced from the bottom edge thereof, the wall of said receptacle opposite said lug having upwardly and inwardly inclined openings one spaced above the other, and a spring clip having a bend at substantially the center thereof insertable through the lower opening in said wall and its inner end engaging on said lug and the bent portion engaging the bottom of the container to urge said container against the top of the receptacle, the outer end of said spring clip having a hook turned in the same direction as the bend in the spring clip with the free end of the hook engaging in the upper opening in said wall.

2. A receptacle of the character described having a closed top and an open bottom, said receptacle being adapted to receive a sealed container through the open bottom, the top of said receptacle having openings therein, a tube extending through one of said openings and its outer end forming a spout, a second tube extending through the other opening in said top serving as an air inlet, the lower ends of the tubes having sharp points for puncturing the top of the sealed container when the receptacle is placed thereover, the inside wall of said receptacle being provided with a lug spaced from the bottom edge thereof, the wall of said receptacle opposite said lug having upwardly and inwardly inclined openings one spaced above the other, resilient washers encircling said tubes between the top of the container and receptacle, and a spring clip having a bend at substantially the center thereof insertable through the lower opening in said wall and its inner end engaging on said lug and the bent portion engaging the bottom of the container to urge said container against the top of the receptacle, the outer end of said spring clip having a hook turned in the same direction as the bend in the spring clip with the free end of the hook engaging in the upper opening in said wall.

3. A holder for fluid container comprising, a casing having a top and an open bottom adapted to house a container insertable through the open bottom, said holder having outlet and vent openings, means in said openings for piercing the top of the container and extending thereto, the inside wall of said holder having a lug spaced from the bottom thereof, the wall of said holder opposite said lug having upwardly and inwardly inclined openings one spaced above the other, and a spring clip having a bend at substantially the center thereof insertable through the lower opening in said wall and its inner end engaging on said lug and the bent portion engaging the bottom of the container to urge said container against the top of the receptacle, the outer end of said spring clip having a hook turned in the same direction as the bend in the spring clip with the free end of the hook engaging in the upper opening in said wall.

FELIX F. WINKLER.

REFERENCES CITED

The following references are of record in the file of this patent:

UNITED STATES PATENTS

| Number | Name | Date |
|---|---|---|
| 1,658,165 | Hopkins | Feb. 7, 1928 |
| 1,710,239 | Paulson | Apr. 23, 1929 |
| 1,745,456 | Shuler | Feb. 4, 1930 |
| 2,033,151 | Ramsey | Mar. 10, 1936 |
| 2,304,457 | Hagan | Dec. 8, 1942 |